W. A. MOFFAT.
WRENCH.
APPLICATION FILED SEPT. 30, 1908.
917,098.
Patented Apr. 6, 1909.
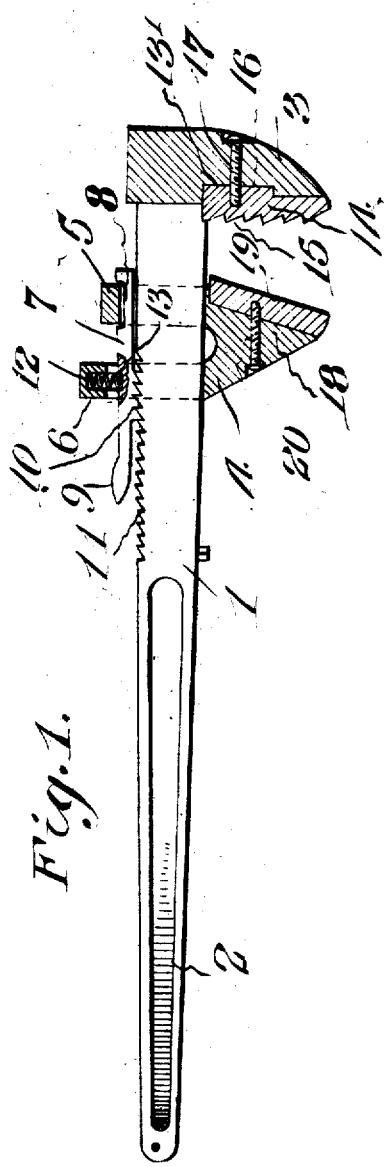
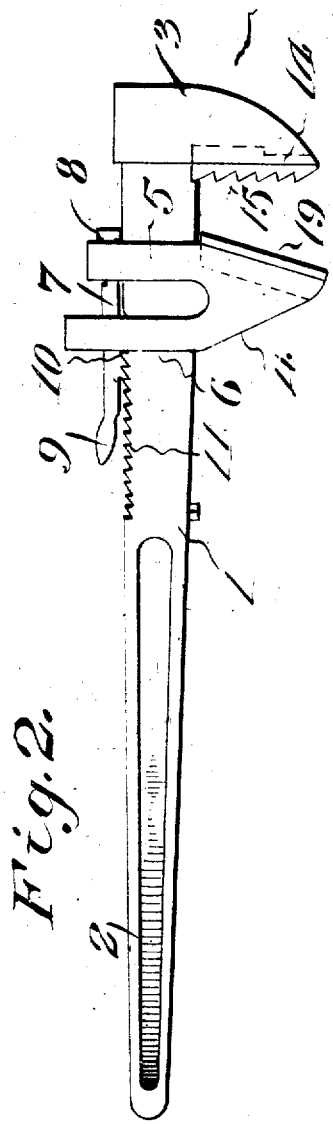
Witnesses:—
Joe. P. Wahler.
C. C. Hires.
Inventor,
W. A. Moffat.
By Victor J. Evans,
Attorney

UNITED STATES PATENT OFFICE.

WALTER ANDREW MOFFAT, OF DENVER, COLORADO, ASSIGNOR TO THE BLAKE WRENCH MANUFACTURING COMPANY, OF DENVER, COLORADO.

WRENCH.

No. 917,098.　　　Specification of Letters Patent.　　　Patented April 6, 1909.

Application filed September 30, 1908. Serial No. 455,579.

*To all whom it may concern:*

Be it known that I, WALTER ANDREW MOFFAT, a citizen of the United States, residing at Denver, in the county of Denver and State of Colorado, have invented new and useful Improvements in Wrenches, of which the following is a specification.

This invention relates to wrenches of that type having fixed and sliding jaws, and one of its objects is to provide a novel construction of means for locking the sliding jaw in adjusted position, and permitting of the ready and convenient release and adjustment of said jaw to different positions as occasion requires.

Another object of the invention is to provide removable bearing members for the faces of the jaws, which bearing members are made of hard metal, thus enabling the jaws to be made of comparatively soft metal, whereby the jaws are rendered strong and durable without increasing the cost of construction.

The invention consists of the features of construction, combination and arrangement of parts hereinafter fully described and claimed, reference being had to the accompanying drawing, in which:—

Figure 1 is a side elevation of the wrench with the jaws appearing in longitudinal section. Fig. 2 is a side elevation thereof.

In the following specification I have used the terms "front", "rear", "upper", and "lower", to respectively designate that part of the wrench carrying the fixed jaw, that part of the wrench on which the handle is formed or provided, the toothed surface of the handle bar or shank, and the reverse surface of said bar or shank, in order that the relative arrangement of these and the coöperating parts may be definitely specified.

Referring to the drawing, 1 represents the handle bar of the wrench, which is preferably of angular form in cross-section and formed at one end to provide a handle 2 and carrying at its opposite end a fixed jaw 3.

A movable jaw 4, of V-form, is arranged to coöperate with the fixed jaw, and is provided with front and rear straps or loops 5 and 6 slidably engaging the bar or shank 1 for the adjustment of said movable jaw toward and from the fixed jaw.

A locking dog 7 projects longitudinally through the straps 5 and 6 and between the
same and the upper edge of the shank 1 and is provided at its forward end with a notch or recess 8 located in its upper edge and arranged to receive the upper cross bar of the strap 5. This slotted end of the dog forms a locking connection between the dog and strap 5, by which the dog is held from dislocation, but at the same time is permitted to have a limited sliding movement on the shank toward and from the upper edge thereof. The rear end of the dog is formed to provide a handle 9, and at a point in advance thereof the dog is provided with a series of downwardly projecting locking teeth 10 adapted to engage a row or series of teeth 11 formed on the upper edge of the bar or shank 1. The front surfaces of the teeth 10 are beveled or inclined, while the rear surfaces of the teeth 11 are correspondingly beveled or inclined, thus permitting the jaw to have a forward movement on the shank for an instantaneous adjustment without releasing the dog, while preventing rearward movement of the jaw on the shank when the dog is in locking position.

In order to normally hold the dog in locking position, a coil spring 12 is seated at its lower end in a seat or recess 13 formed in the upper face of the dog above the teeth 10 and is inclosed at its opposite end in the upper cross portion of the strap 6 which is channeled or chambered for its reception, and by which the spring is held from displacement. The pressure of the spring holds the dog downward with its teeth in locking position, so as to prevent casual retraction of the dog and rearward movement of the sliding jaw, but by pulling upward on the handle 9 the dog may be tilted on its notched forward end against the pressure of the spring to withdraw its teeth 10 from engagement with the teeth 11 for the convenient retraction of the jaw, as will be readily understood.

The jaw 3 is provided in its inner face with a socket or recess 13', and arranged to bear against said face of the jaw is a bearing plate 14 preferably provided with gripping teeth or serrations 15 and having a lug or projection 16 extending into said recess, the recess and lug being preferably of angular form to hold the plate against possible rotary movement. The plate is detachably fastened in position by a screw 17 working in a threaded opening in the body of the jaw and having its head countersunk in a recess in the front face of said jaw.

The oblique or beveled front face of the movable jaw 4 is similarly provided with a recess 18 to receive a bearing plate 19 of hard metal. The plate and recess are of angular form to hold said plate against rotary movement, and the recess is provided with side walls to prevent lateral deflection of the plate. A screw 20 extends forwardly through the jaw from the rear side thereof and enters the plate to detachably fasten the same in position, the head of the screw being countersunk in a recess in the rear of the jaw, as illustrated in Fig. 1. Ordinarily, the jaws are made of soft metal and chilled or otherwise treated to produce hardened bearing faces, but these faces quickly become worn and indented and decrease the effectiveness of the gripping action. The present construction provides hardened steel bearing plates or faces for the jaws which may be employed for a long time without injury and which will enable a firm and strong non-slipping gripping action to be obtained. The use of these plates obviates the necessity of hardening the jaws by chilling or other methods and increases the period of usefulness of the wrench without adding to the cost of construction thereof.

Having thus fully described the invention, what is claimed as new is:—

1. A wrench comprising a guide shank, a fixed jaw carried thereby, a movable jaw having front and rear straps slidably engaging the guide shank, a pawl extending through the straps and having a notched forward end receiving and pivotally engaging the cross portion of the strap and provided with teeth or serrations to engage the serrated surface of the guide shank, and a spring housed within the upper cross portion of the rear strap and bearing on said dog to normally hold the same in locking position.

2. A wrench comprising a serrated guide shank, a stationary jaw carried thereby, a movable jaw provided with front and rear straps engaging the shank, the rear strap being formed in its cross portion with a channel or chamber, a dog extending longitudinally between the serrated side of the shank and the straps and through the latter, said dog having its forward end notched to receive and pivotally engage the cross portion of the front strap and its rear end provided with a handle and projecting locking teeth to engage the shank, and a coil spring housed in the chamber or channel of the rear strap and bearing on the jaw to normally hold the same in locking position.

In testimony whereof I affix my signature in presence of two witnesses.

WALTER ANDREW MOFFAT.

Witnesses:
F. WHITEHEAD,
A. P. MACKEY.